United States Patent [19]

Naarmann et al.

[11] 4,060,679

[45] Nov. 29, 1977

[54] METHOD OF PREPARING A LOW MOLECULAR WEIGHT PAPER SIZE POLYMER BY CONTINUOUS POLYMERIZATION IN THE ABSENCE OF INITIATOR

[75] Inventors: Herbert Naarmann, Wattenheim; Fritz Reichel, Eppelheim; Hermann Gausepohl, Mutterstadt, all of Germany

[73] Assignee: BASF Aktiengesellschaft, Ludwigshafen, Germany

[21] Appl. No.: 675,581

[22] Filed: Apr. 9, 1976

[30] Foreign Application Priority Data

May 2, 1975   Germany .............................. 2519581

[51] Int. Cl.$^2$ ........................ C08F 20/70; C08F 22/58; C08F 220/60; C08F 226/00
[52] U.S. Cl. ................ 526/304; 162/168 N; 162/168 NA; 428/514; 526/307; 526/312
[58] Field of Search ................ 526/304, 307, 312

[56] References Cited

U.S. PATENT DOCUMENTS

| | | | |
|---|---|---|---|
| 2,595,907 | 5/1952 | Thomas et al. | 526/307 |
| 2,654,729 | 10/1953 | Price | 526/307 |
| 2,879,255 | 3/1959 | Coover | 526/307 |
| 2,980,657 | 4/1961 | Melamed | 526/307 |
| 3,040,012 | 6/1962 | Maeder | 526/307 |
| 3,043,822 | 7/1962 | Maeder | 526/312 |
| 3,186,973 | 6/1965 | Maeder | 526/307 |
| 3,308,081 | 3/1967 | Glabisch | 526/312 |
| 3,395,198 | 7/1968 | Taniguchi et al. | 526/312 |
| 3,541,037 | 11/1970 | Finn et al. | 526/312 |
| 3,629,209 | 12/1971 | McDonald et al. | 526/307 |
| 3,873,646 | 3/1975 | Hoke | 526/307 |

*Primary Examiner*—Herbert J. Lilling
*Attorney, Agent, or Firm*—Keil, Thompson & Shurtleff

[57] ABSTRACT

A paper size comprising a water-soluble salt of a copolymer of from 30 to 85% by weight of olefins of 2 to 12 carbon atoms, having a terminal double bond, and/or vinyl ethers, and from 15 to 70% by weight of basic acrylic and/or methacrylic compounds, which copolymer has a molecular weight of from 600 to 4,500 and is manufactured by continuous copolymerization at from 130° to 320° C.

5 Claims, No Drawings

METHOD OF PREPARING A LOW MOLECULAR WEIGHT PAPER SIZE POLYMER BY CONTINUOUS POLYMERIZATION IN THE ABSENCE OF INITIATOR

The present invention relates to a paper size based on a water-soluble salt of a copolymer of one or more olefins of 2 to 12 carbon atoms, having a terminal double bond, and/or one or more vinyl ethers, and one or more basic acrylic and/or methacrylic compounds.

In order to reduce the rate of penetration of water and other fluids into paper to the desired degree, it is necessary to size paper, ie. partially to render it hydrophobic. Such sizing is essential, eg. for writing papers or printing papers.

Papers and boards can be sized with sizes which are either added to the paper pulp ("engine sizing") or applied to the finished paper web by means of suitable applicators, eg. size presses, spraying equipment and the like ("surface sizing"). The engine size used most extensively even at the present time is a resin size based on rosin. The sizing thereby achieved is very effective but is dependent on the presence of a rather large amount of aluminum sulfate.

A large number of synthetic sizes have been developed for surface sizing, and have been described in the literature. The conventional sizes are as a rule obtained by free radical copolymerization of the monomers on which they are based. In order to manufacture low molecular weight polymers suitable for paper sizing, the monomers must be polymerized in the presence of substantial amounts of regulators and initiators which are chemically built into the copolymer molecule. Since only copolymers of relatively low molecular weight are used for paper sizing, the properties of the copolymer are adversely affected by this undesirable incorporation of the regulators and initiators.

It is an object of the present invention to provide a paper size of the type described above, which has a more uniform composition, possesses a sizing action which is not as dependent on fluctuations in pH values as that of the conventional sizes, and which is obtained in constant quality from the manufacturing process, even over extended periods.

We have found that this object is achieved by a copolymer which contains, as copolymerized monomer units, a. from 30 to 85 percent by weight of one or more olefins of 2 to 12 carbon atoms having a terminal double bond, and/or one or more vinyl ethers, b. from 15 to 70 percent by weight of one or more basic acrylic and/or methacrylic compounds of the general formula

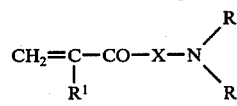

where $R^1$ is H or $CH_3$, R is alkyl of 1 to 4 carbon atoms, $-CH_2OH$ or $-CH_2-CH_2-OH$, X is $-O-CH_2-CH_2-$, $-O-CH_2-CH_2-CH_2-$,

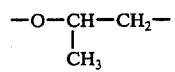

or $-NH-(CH_2)_n-CH_2$ and n is from 1 to 3, and which has a molecular weight of from 600 to 4,500 and is manufactured by continuous copolymerization of the monomers at from 130° to 320° C.

The monomers of group (a), when homopolymerized, give hydrophobic polymers. Examples of suitable monomers are olefins of 2 to 12 carbon atoms, eg. ethylene, propylene, butene-1 and 4-methylpentene-1, as well as olefins containing aromatic groups and having up to 12 carbon atoms, eg. styrene, vinyl toluene or more highly substituted styrenes. Examples of suitable vinyl ethers are vinyl methyl ether, vinyl ethyl ether, vinyl n-propyl ether and/or vinyl isopropyl ether, vinyl n-butyl ether, vinyl sec.-butyl ether, vinyl tert.-butyl ether and vinyl dodecyl ether.

This group of monomers, which when homopolymerized, or copolymerized with one another, give hydrophobic polymers, account for from 30 to 85 percent by weight, preferably from 40 to 75 percent by weight, of the structure of the copolymers. Of the monomers mentioned, styrene is preferred for the manufacture of the copolymers. However, it is also possible to employ two or more of the said monomers of group (a) for the manufacture of the copolymer, eg. styrene and octene-1, or styrene and vinyl butyl ether.

In addition, the copolymers contain at least one monomer of group (b). These monomers have the general formula

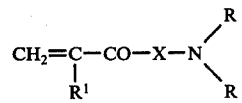

where $R^1$ is H or $CH_3$, R is alkyl of 1 to 4 carbon atoms, $-CH_2-OH$ or $-CH_2-CH_2-OH$, X is $-O-CH_2-CH_2-$, $-O-CH_2-CH_2-CH_2-$,

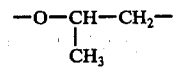

or $-NH-(CH_2)_n-CH_2-$ and n is from 1 to 3. The following compounds are examples of suitable monomers of group (b):

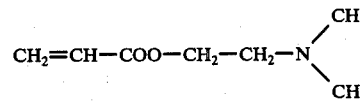

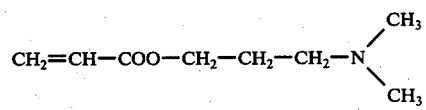

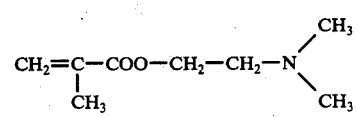

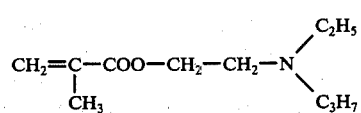

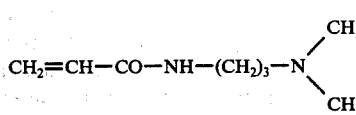

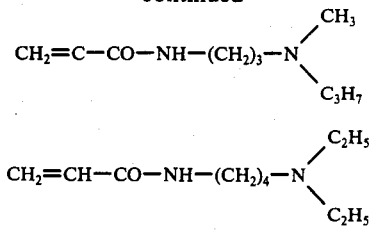

$$CH_2=C-CO-NH-(CH_2)_3-N\begin{smallmatrix}CH_3\\C_3H_7\end{smallmatrix}$$

$$CH_2=CH-CO-NH-(CH_2)_4-N\begin{smallmatrix}C_2H_5\\C_2H_5\end{smallmatrix}$$

The said monomers account for from 15 to 70, preferably from 20 to 60, percent by weight of the structure of the copolymers. The copolymer can also contain two or more of the monomers mentioned under b) as copolymerized units.

The copolymer can in addition contain up to 15 percent by weight of one or more other monomers, eg. acrylic acid esters, methacrylic acid esters, maleic acid dialkyl esters, acrylamide, methacrylamide, acrylonitrile, vinyl methyl ketone and vinyllactic acid.

The molecular weight of the copolymers is from 600 to 4,500, preferably from 1,000 to 3,000.

The copolymers which can be used for paper sizing are manufactured by continuous copolymerization of the monomers at from 130° to 320° C. The copolymerization is carried out in the absence of regulators and, in contrast to the state of the art, also in the absence of polymerization initiators. The pressures used are generally above 1 bar and preferably from 3 to 50 bars; they can even be as high as 100 bars or more, but in that case appropriately designed apparatus is required.

Preferably, the polymerization is carried out thermally at from 170° to 250° C. However, the conventional sources of free radicals can also be used in carrying out the polymerization, eg. azo compounds, organic peroxides, such as benzoyl peroxide and lauroyl peroxide, or hydroperoxide, eg. tert.-butyl hydroperoxide. Oligomers of p- or m-diisopropylbenzene, or other compounds in which the C-C bond can easily be split thermally, may also be employed. From 0.1 to 3 percent by weight, based on the monomers, of the said sources of free radicals are suitably used. This means that a substantially smaller amount of the source of free radicals is required, for the manufacture of polymers of relatively low molecular weight, than is the case with the conventional processes.

The polymerization apparatus used may be, eg., a pressure kettle, a pressure kettle cascade, a pressure tube or a pressure kettle followed by a reaction tube and provided with a static mixer. Preferably, the monomers are polymerized in at least two successive polymerization zones. For example, one reaction zone can consist of a pressure-resistant kettle and the other of a pressure-resistant reaction tube, preferably a heated static mixer. If the polymerization is carried out in two successive zones, conversions above 90% are achieved. During the polymerization, good mixing of the components must be provided; for example, pressure-resistant kettles equipped with a stirrer, or polymerization tubes comprising a static mixer, are used.

The copolymerization is carried out continuously. For example, a copolymer of styrene and diethylaminoethyl acrylate is obtained by continuously feeding the monomers to a reactor or to two successive polymerization zones, eg. a pressure kettle cascade, and continuously discharging the product from the reaction zone after a residence time of from 3 to 60 minutes, preferably from 5 to 30 minutes, at from 130° to 320° C.

For the purposes of the present invention, the term "continuous polymerization" is taken to include a method in which initially about 10% of the monomer mixture is introduced into a polymerization zone, eg. into a kettle, and thereafter the remainder of the monomer mixture is run in continuously in the course of from 30 to 300 minutes. In this embodiment, the space-time yield is, however, not as high as in the case of continuous polymerization in two successive reaction zones.

In contrast to the conventional process, the process according to the invention is preferably carried out in the absence of a solvent or diluent. However, solvents which do not act as regulators, eg. dioxane, toluene, dimethylformamide, tetrahydrofuran, benzene or xylene, may also be used.

In the case of continuous or semi-continuous polymerization, a polymer melt which can be converted directly, by treatment with liquid or gaseous acids, into the salt of the copolymer, is obtained. Examples of suitable acids are formic acid, acetic acid, propionic acid, hydrochloric acid, phosphoric acid, succinic acid, α-chloropropionic acid and lactic acid.

It usually suffices to neutralize the copolymers to the extent of about 80%.

In order to use the salts of the copolymers as sizes, the neutralized or partially neutralized copolymer is dissolved in water and diluted to the concentration required for paper sizing, eg. to a polymer content of from 0.1 to about 1%, based on the treatment solution. The salts of the copolymers give clear solutions in water. The amount of solid applied to the paper is as a rule from 0.05 to 5, preferably from 0.1 to 2, percent by weight, based on the amount of paper stock. The treatment solution may in addition contain from 0 to about 8 percent by weight of starch.

As in the conventional processes for surface sizing of paper, aluminum salts or iron-III salts may be present when using the anionic sizes of the invention for the sizing of paper. The amounts of such salts are from 0 to 5 percent by weight, based on paper stock. If the said inorganic salts are employed, they are either added to the paper pulp, or the finished paper is impregnated with a solution of the salts before applying the copolymer salt. The size according to the invention is compatible with conventional paper auxiliaries, eg. fillers, pigments, dyes, wet strength agents, brighteners and other additives. Papers of all weights and types may be sized with the paper size according to the invention, including papers and boards made from bleached or unbleached sulfite pulp or sulfate pulp and mechanical pulp. The copolymer salts described above may be used as surface sizes or as engine sizes. However, they are preferably used as the former, by applying an aqueous solution of the salts of the copolymer to a previously finished paper web.

Using the sizes according to the invention, papers with excellent sizing effects are obtained. The advantage over conventional paper sizes is, above all, that fluctuations in the acidity of the paper which may arise due to varying quality of the fresh water or of the backwater in the paper manufacturing process do not lead to variations in the degree of sizing. Accordingly, the sizing is substantially independent of the pH of the pulp water. The sizes of the invention are rapidly taken up by the fibers and hence make it possible to run at high machine speeds.

The Examples which follow illustrate the invention. Parts and percentages are by weight. The molecular weights given in the description and in the Examples were determined by vapor pressure osmometry in chloroform at a concentration of 0.1 percent by weight and 37° C (Mechrolab osmometer). The sizing action of the copolymer salts was determined from the Cobb sizing degree (one minute) and the ink flotation test (time in minutes to give 50% strike-through), using DIN 53,126 test ink.

EXAMPLE 1

A mixture of 55 parts of styrene, 30 parts of

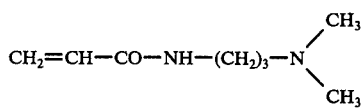

and 15 parts of methyl acrylate is fed continuously to a polymerization zone which consists of a 1 liter pressure kettle followed by a pressure tube (capacity 1.5 liters) equipped with a static mixer. The polymerization is carried out at 200° C. The average residence time of the monomers in the polymerization zone is 20 minutes and the pressure is 20 bars. The residual monomers (about 1%) are removed under a pressure of from 10 to 15 mm Hg at from 120 to 180° C. The melt is then treated with acetic acid vapor and sufficient water is added to give an aqueous solution of the copolymer salt, having a solids content of 30%. The copolymer has a molecular weight of 1,950.

The solution is diluted with water to a solids content of 0.6% and after the conventional addition of 6% of an oxidatively degraded potato starch, which serves to harden the paper, the mixture is used as a paper size (hereinafter referred to as size 1).

Two different test papers are sized with the size described above. The results obtained in each case are listed in Table 1. Test paper A: wood-free offset, 14% ash (clay), 1% alum; manufactured at a pulp water pH of 6.8; 80 g/m². Test paper B: wood-free offset, 14% ash (clay), 4% alum; manufactured at a pulp water pH of 4.6; 80 g/m².

TABLE 1

| | Test paper A | | Test paper B | |
|---|---|---|---|---|
| Size | °Cobb (1 minute) | 50% ink strike-through (minutes) | °Cobb (1 minute) | 50% ink (strike-through) (minutes) |
| 1 | 16.0 | 28 | 18.0 | 18.5 |

EXAMPLE 2

Sizes of the composition listed below (each containing 0.6% of solids and 6% of starch in the treatment solution) were applied to the test papers A and B described in Example 1, the solids pick-up being 0.4% of copolymer and 4% of starch, based on dry paper. The sizing action was determined by means of the Cobb test (1 minute) and the ink flotation test (minutes to give 50% strike-through), using DIN 53,126 test ink. The results are listed in Table 2. Size 2 consists of a copolymer of 75% of styrene and 25% of $CH_2=CH-CONH-(CH_2)_3-N(CH_3)_2$. It is in the form of the ammonium salt and is 90% neutralized with acetic acid. The copolymer has a molecular weight of 2,850. The monomers were polymerized continuously at 210° C under a pressure of 20 bars, with a residence time of 15 minutes, in the apparatus described in Example 1.

Size 3 is based on a copolymer of 58% of styrene, 10% of vinyl isobutyl ether, 20% of

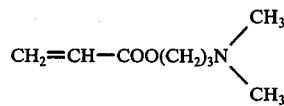

and 12% of methyl acrylate. It is employed in the form of the ammonium salt (neutralized with phosphoric acid, degree of neutralization 98%, molecular weight 2,600). The monomers were polymerized continuously, in the apparatus described in Example 1, at 180° C under a pressure of 17 bars and with a residence time of 20 minutes.

Size 4 is based on a copolymer of 80% of styrene and 20% of

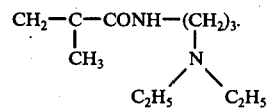

It is in the form of the ammonium salt, degree of neutralization 95%, neutralized with hydrochloric acid, molecular weight 2,300. The monomers were polymerized continuously, in the apparatus described in Example 1, at 180° C under a pressure of 20 bars and with a residence time of 18 minutes.

TABLE 2

| | Test paper A | | Test paper B | |
|---|---|---|---|---|
| Size | °Cobb (1 minute) | 50% ink strike-through (minutes) | °Cobb (1 minute) | 50% ink strike-through (minutes) |
| 2 | 16.0 | 22 | 18.0 | 19 |
| 3 | 17.5 | 26 | 18.0 | 21 |
| 4 | 18.5 | 22 | 17.5 | 21.5 |

EXAMPLE 3

A wood-free offset test paper which contains 10% of ash (clay) and 2% of alum and has a weight of 70 g/m² is treated with a solution which contains 0.4% (calculated as solids) of the ammonium salt of a copolymer of 67% of styrene, 18% of

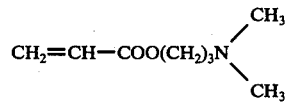

and 15% of methyl methacrylate (molecular weight of the copolymer 3,000, neutralized with acetic acid) as the size and 6% of a low viscosity corn starch as a hardener. The Cobb value (1 minute) is 19.0 and the ink flotation test (50% strike-through) gives a value of 21 minutes.

The copolymer was obtained by continuous polymerization at 160° C under a pressure of 20 bars, using 2% of di-tert.-butyl peroxide, based on the monomers employed. The residence time was 30 minutes. The conversion was 99%. Without use of the initiator, about 96% conversion is achieved. After removing the residual monomer at 180° C and a pressure of 10 mm Hg, the melt passes through a second static mixer (3 liters). In this, the product is neutralized with acetic acid, which is metered in, by means of a piston pump, through a side branch immediately before the melt enters the mixer.

EXAMPLE 4

A wood-free offset test paper which contains 21% of chalk (calculated as CaCO₃) and 0.2% of alum and has a weight of 70 g/m² is treated with a paper size which consists of a copolymer of 67% of styrene, 18% of

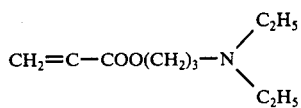

and 15% of n-propyl itaconate, the copolymer having a molecular weight of 2,700 and having been neutralized with acetic acid. The Cobb value of the sized paper is 17.5 (1 minute) and the ink flotation test (50% strike-through) gives a value of 51 minutes.

The copolymer was manufactured by continuous polymerization at 190° C and a pressure of 20 bars in the apparatus described in Example 1. The residence time was 12 minutes. The reaction of the copolymer with acetic acid was carried out as in Example 3.

EXAMPLE 5

A test paper of 40% of bleached sulfite cellulose, 30% of bleached beech pulp and 30% of bleached mechanical pulp, having an ash content of 8% (clay) and containing 1% of alum, and having a weight of 85 g/m², is impregnated by the method described in Example 1 with a solution containing 0.8% of a copolymer of 80% styrene, 15% of

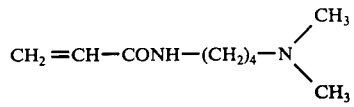

and 5% of methyl acrylate, which copolymer has been neutralized with acetic acid, and 6% of starch. The molecular weight of the copolymer is 2,600, the Cobb value of the sized paper is 19.0 (1 minute) and the ink flotation test (50% strike-through) gives a value of 18 minutes.

EXAMPLE 6

If a test paper of the type described in Example 5, but containing 3% of alum, is sized, the Cobb value is 19.0 (1 minute) and the ink flotation test (50% strike-through) gives a value of 17 minutes.

We claim:
1. A process for the manufacture of a paper size by continuous polymerization of:
   a. from 30 to 85 percent by weight of olefins of 2 to 12 carbon atoms having a terminal double bond selected from the group consisting of ethylene, propylene, butene-1 and 4-methylpentene-1, olefins containing aromatic group and having up to 12 carbon atoms selected from the group consisting of styrene and vinyl toluene, vinyl ethers selected from the group consisting of vinyl methyl ether, vinyl ethyl ether, vinyl n-propyl ether, vinyl isopropyl ether, vinyl n-butyl ether, vinyl sec.-butyl ether, vinyl tert.-butyl ether and vinyl dodecyl ether and mixtures thereof,
   b. from 15 to 70 percent by weight of one or more basic acrylic and/or methacrylic compounds of the general formula

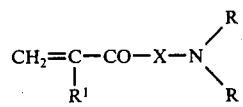

where $R^1$ is H or CH₃, R is alkyl of 1 to 4 carbon atoms, —CH₂OH or —CH₂—CH₂—OH, X is —O—CH₂—CH₂—, —O—CH₂—CH₂—CH₂—,

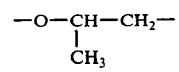

or —NH—(CH₂)ₙ—CH₂— and n is from 1 to 3, at from 130° to 320° C, in the absence of polymerization initiators said process taking place at a pressure of greater than 1 bar and with a residence time of from 3 to 60 minutes.

2. A process as claimed in claim 1, wherein the copolymerization is carried out in the additional presence of up to 15% by weight of an alkyl ester of an ethylenically unsaturated carboxylic acid of 3 to 5 carbon atoms.

3. A process as claimed in claim 1, wherein the copolymerization is carried out in the absence of a solvent or diluent.

4. A process as claimed in claim 1, wherein from 40 to 75 percent by weight of monomer(s) (a) and from 20 to 60 percent by weight of monomer(s) (b) are employed.

5. A process as claimed in claim 1, wherein component (a) of the monomer (s) comprises styrene and component (b) is a monomer individually identified hereinbefore.

* * * * *